United States Patent [19]

Knecht et al.

[11] Patent Number: 4,880,086
[45] Date of Patent: Nov. 14, 1989

[54] ADJUSTABLE VIBRATION DAMPER

[75] Inventors: Heinz Knecht; Norbert Ackermann, both of Eitorf, Fed. Rep. of Germany

[73] Assignee: Boge AG, Eitorf, Fed. Rep. of Germany

[21] Appl. No.: 202,979

[22] Filed: Jun. 6, 1988

[30] Foreign Application Priority Data

Jun. 6, 1987 [DE] Fed. Rep. of Germany ....... 3719113

[51] Int. Cl.$^4$ .......................... B60G 17/08; F16F 9/50; F16F 15/04
[52] U.S. Cl. .................................... 188/299; 188/298; 188/315; 188/318; 188/322.13; 280/707; 280/714
[58] Field of Search .............. 188/299, 322.13, 322.14, 188/318, 319, 317, 316, 315, 311–314, 300, 281, 282, 284, 285, 286, 298, 322.19, 320; 280/714, 707; 251/129.05; 440/61; 267/64.11, 64.22, 64.18, 64.15–64.17

[56] References Cited

U.S. PATENT DOCUMENTS

| 3,584,712 | 6/1971 | Dickinson | 188/318 X |
| 3,621,950 | 11/1971 | Lutz | 188/318 X |
| 3,991,863 | 11/1976 | Lee | 188/299 X |
| 4,010,829 | 3/1977 | Naito et al. | 188/298 X |
| 4,054,277 | 10/1977 | Sirven | 188/298 X |
| 4,325,468 | 4/1982 | Siorek | 188/322.14 X |
| 4,445,673 | 5/1984 | Clark | 188/299 X |
| 4,502,673 | 3/1985 | Clark | 188/299 X |
| 4,597,411 | 7/1986 | Lizell | 188/322.14 X |
| 4,650,042 | 3/1987 | Knecht et al. | 188/313 X |
| 4,749,069 | 6/1988 | Knecht et al. | 188/299 |
| 4,752,062 | 6/1988 | Domenichini | 188/299 X |
| 4,785,920 | 11/1988 | Knecht et al. | 188/299 |
| 4,802,561 | 2/1989 | Knecht et al. | 188/299 X |

FOREIGN PATENT DOCUMENTS

| 1242945 | 6/1967 | Fed. Rep. of Germany . | |
| 1455903 | 6/1969 | Fed. Rep. of Germany | 188/318 |
| 2119531 | 4/1971 | Fed. Rep. of Germany . | |
| 2655811 | 6/1978 | Fed. Rep. of Germany | 188/322.14 |
| 2915012 | 11/1980 | Fed. Rep. of Germany | 188/318 |
| 3712477 | 10/1987 | Fed. Rep. of Germany | 188/299 |
| 3723033 | 2/1988 | Fed. Rep. of Germany | 188/315 |
| 0042570 | 4/1979 | Japan | 188/322.14 |
| 0621630 | 4/1949 | United Kingdom | 188/322.14 |

Primary Examiner—Douglas C. Butler
Attorney, Agent, or Firm—Nils H. Ljungman

[57] ABSTRACT

Adjustable vibration damper, in particular for motor vehicles, with a cylinder containing a damping fluid, an axially-movable piston rod inserted in the cylinder in a sealed manner, and a damping piston fastened to the piston rod, which piston divides the cylinder into two work chambers, whereby a damping valve with an axially-movable valve body and a valve seat controls the effective cross section of a damping passage. Control of such a vibration damper should guarantee a continuous adjustment capability, a high adjustment speed, a good temperature behavior and reliably reproducible damping force characteristics, as well as the use of a small amount of control energy. For this purpose, starting from its pressurized end surface, the valve body comprises at least one constant throttle hole running toward the opposite rear side, and another throttle hole running from the rear side in the discharge direction of the damping passage is controlled by a continuously adjustable control pin, whereby the rear side of the valve body and the housing guiding the valve body form a control chamber.

19 Claims, 6 Drawing Sheets

ADJUSTABLE VIBRATION DAMPER

BACKGROUND OF THE INVENTION

1. Field of the Invention:

This invention relates to an adjustable vibration damper, in particular for motor vehicles, with a cylinder containing a damping fluid, an axially-movable piston rod projecting into the cylinder in a sealed manner, and a damping piston fastened to the piston rod, which piston divides the cylinder into two work chambers, whereby a damping valve with an axially-movable valve body and a valve seat controls the effective cross section of a damping passage.

2. Description of the Prior Art:

The prior art includes hydraulic, adjustable dampers, e.g., German Laid Open Patent Application No. DE-OS 21 19 531, in which there is a first damping element plus a line equipped with a regulating valve. In a closed loop, always separately, are a regulating valve and a damping element. The adjustment of the regulating valve is done manually or by the action of one of the vehicle mechanisms. A disadvantage with this type of damper is that it is difficult to manufacture on account of the inclusion of a line and components located in series. Moreover, the mechanical activation produces a certain damping force, and with different damping force characteristics, variability is impossible to achieve. The prior art also includes hydraulic vibration dampers, e.g., German Patent Publication Published for Opposition Purposes No. DE-AS 12 42 945, whose damping characteristic can be electromagnetically regulated by changing the flow of the hydraulic damping medium through the damping valves. In such a case, there is a bypass connection, in which a damping valve controls a spring loaded valve body, so that the damping force in the decompression stage can be regulated in relation to the compression stage. The valve body is thereby held either in the open or the closed position by means of the electromagnet. Each of the above-mentioned patents are incorporated by reference as if the entire contents thereof were fully set forth herein.

OBJECT OF THE INVENTION

The object of the invention is to create a control for an adjustable, hydraulic vibration damper which, with a continuous adjustment capability, retains a high adjustment speed, a good temperature behavior and reliably reproducible damping force characteristics, with the use of a small amount of control energy.

SUMMARY OF THE INVENTION

The invention achieves this object, in that the valve body, starting from its pressurized end surface, has at least one constant throttle cross section running toward the rear side located on the opposite end, and another throttle cross section running from the rear side in the discharge direction of the damping passage, by means of which the position of an axially movable control pin can be continuously controlled.

An advantage of this configuration is that to control and regulate the damping medium in the vibration damper, there is a pilot valve, which has an independent pilot control stage. The pressure difference producing the damping force is hereby used to adjust the valve body. The axially movable valve body thereby forms the connection of the damping passage on the pressure side and the discharge side. The control chamber is connected on the discharge side by means of the self-adjusting, variable throttle hole working together with the valve body and the control pin, and on the damping side by means of the constant throttle hole with the damping passage. An advantage of this configuration is that not only are high adjustment speeds possible with a low control energy, but a good temperature behavior and reliably reproducible damping force control can also be achieved, along with a continuous adjustment capability.

In a particularly advantageous embodiment, the valve body, starting from its pressurized end surface, has at least one constant throttle cross section running toward the rear side located on the opposite end, and another throttle cross section running from the rear side in the discharge direction of the damping passage, by means of which the position of an axially movable, spring loaded control pin can be regulated, whereby the rear side of the valve body and the housing guiding the control pin are part of the wall of a control chamber.

According to another characteristic, the damping valve is located in a bypass running between the work chambers. In this configuration, the damping valve can be located outside the cylinder of the vibration damper, and can be regulated not only manually, but also electronically by means of an appropriate actuator.

In one configuration of the invention, the valve body is held against the valve seat by means of a spring. There can also be a spring for the corresponding pressurization of the control pin between the valve body and the control pin. Such a spring support is used to achieve the desired damping force characteristics.

According to another essential characteristic of the invention, the valve body is designed as a flexible membrane in sealed contact on the outer circumference. The throttle hole acted on by the control pin is advantageously located in the center of the flexible membrane. Moreover, in one configuration of the invention, the spring acting on the control pin can be designed as a spring washer or a spiral spring. Certain specified adjustments can also be set by an actuator which adjusts the spring acting on the control pin. This actuator is activated either directly manually or automatically by means of a suitable adjustment drive and electronic system.

In one configuration of the invention, the control pin, on its side facing the rear side of the valve body, has a pressurized control surface. The control pin can also be actuated by an actuator.

One aspect of the invention resides broadly in a vibration damper for motor vehicles, the damper comprising a cylinder assembly having an arrangement for varying damping of a piston assembly disposed therein, the piston assembly dividing the cylinder into at least two chambers, each for containing damping fluid, the vibration damper comprising: arrangement for throttling the damping fluid when the damping fluid moves from one of the chambers into another; the piston assembly having a piston rod and piston; the piston rod having first arrangement for attachment of the piston rod at one end thereof; the cylinder assembly having second arrangement for attachment at a portion thereon other than the first arrangement for attachment at the piston rod; arrangement for bypassing damping fluid between the at least two chambers arrangement for accepting bypassed damping fluid; the bypassing arrangement being disposed to bypass the damping fluid from at least one of the damping fluid-containing chambers to the accepting arrangement; the bypassing arrangement including damping valve apparatus for regulating flow of the damping fluid in the bypassing apparatus; the damping valve apparatus comprising: a principal valve seat and a first displaceable component for opening and closing against the principal valve seat; the first displaceable component having a first portion for being disposed against the valve seat and a second portion opposite the first portion; a first, constantly open, bypass orifice being disposed at least in the first portion of the first displaceable component for bypassing pressure buildup at the first portion at least to the second portion of the displaceable component; second bypass orifice being disposed in the first displaceable component for bypassing pressure buildup substantially at the second portion to at least a part of the first portion of the first displaceable component; and a second displaceable component for varying flow through the second bypass orifice.

BRIEF DESCRIPTION OF THE DRAWINGS

Preferred embodiments are illustrated in the accompanying drawings.

DESCRIPTION OF THE PREFERRED EMBODIMENTS

Figure 1:
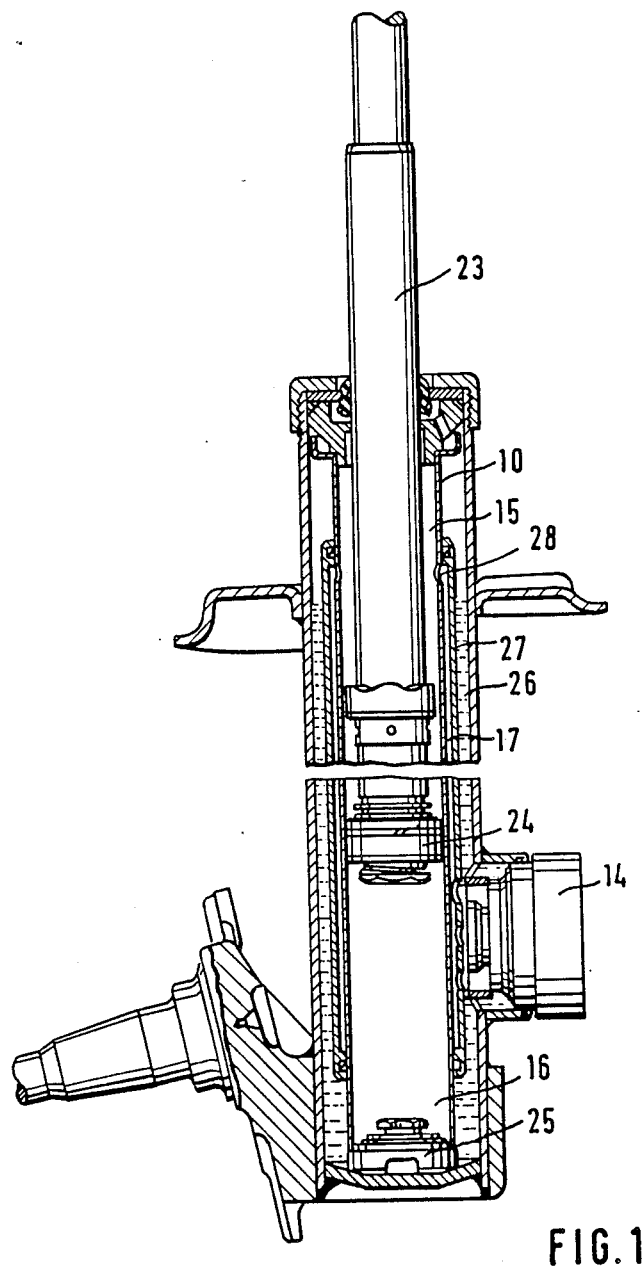
FIG. 1 shows a view of a vibration damper with a control located in a separate component.

FIG. 1 is a schematic illustration of a two-tube vibration damper, which comprises the cylinder 10, a piston rod 23 and a damping piston 24 fastened to the piston rod 23. The damping piston 24 divides the cylinder 10 into the upper work chamber 15 and the lower work chamber 16. The damping piston 24 is equipped with passages and throttle valves. In the base of the cylinder 10, there is a base valve 25, by means of which the damping medium can get into the equalization chamber 26. In the equalization chamber 26, there is a tube 27, which forms a bypass 17 via the holes 28. In this bypass 17, there is a damping valve 14 which is hydraulically connected to the control. The bypass 17 works together with the control, parallel to the throttle valves of the damping piston 24 and to the base valve 25.

Figure 2:
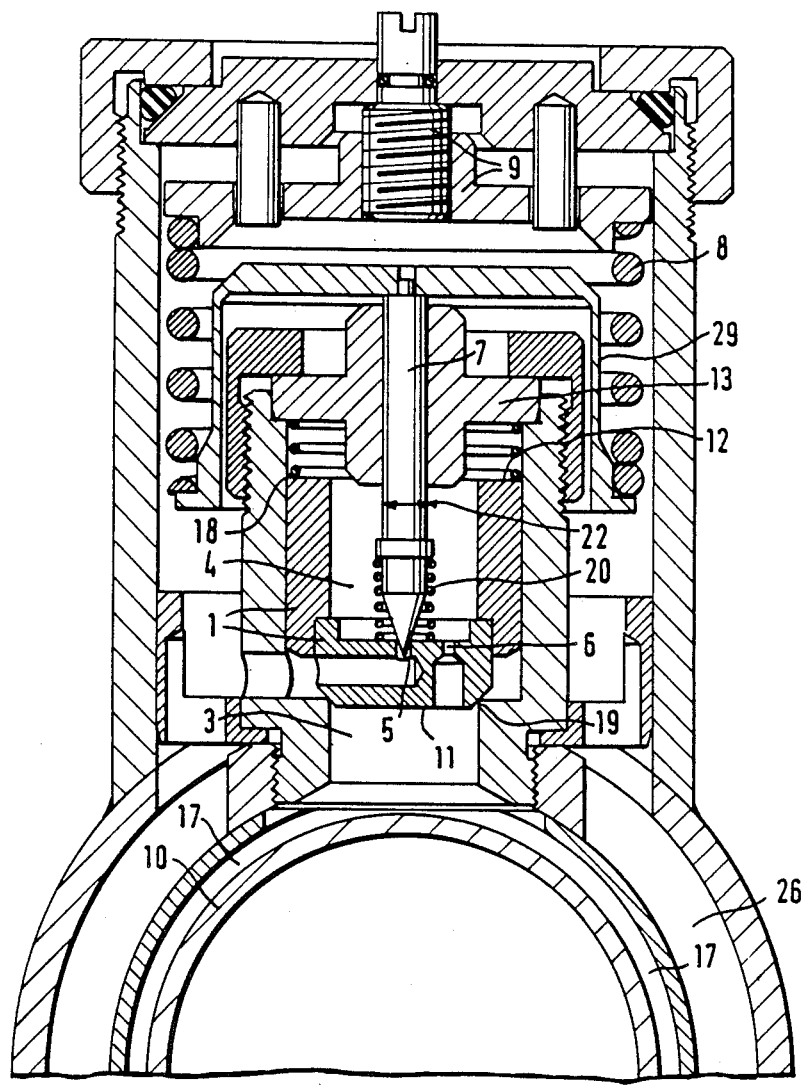
FIG. 2 shows the control in a separate component from FIG. 1, on an enlarged scale.

FIG. 2 shows the damping valve 14 on an enlarged scale, and in particular the cylinder 10, the bypass 17 formed by the tube 27 and the equalization chamber 26. Starting from the bypass 17, the damping medium travels on the pressure side into the damping passage 3 and pressurizes the end surface 11 of the valve body 1. Simultaneously, damping medium travels through the constant throttle hole 6 into the control chamber 4 and pressurizes the rear side 12 of the valve body 1 and the control pin 7. If the pressure of the damping medium in the passage 3 connected with the work chamber 15 increases, then this pressure increase travels through the throttle cross section 6 into the control chamber 4, and the pin, pressurized via the cross section 22 and working together with the spring 8, is moved out of its initial position. The release of the variable cross section 5 connected with the return causes a slowing of the pressure increase in the control chamber 4, until the pressure in the passage 3 and in the chamber 4 are in an inverse ratio to the pressurized valve body surfaces. This ratio is precisely maintained, even if the damping pressure continues to increase, as a result of the fact that the valve body 1 follows the pin 7 moving against the force of the spring 8, so that the cross section 5 which can be changed by interaction between the disc and the pin is maintained at the value necessary for the equilibrium condition on the valve body. The spring 8 is thereby used to achieve the desired damping characteristic. The variability of the damping force characteristics can be achieved by adjusting the spring by means of the actuator 9. The control pin 7 is contained in the housing 13, and the inner wall of the housing 13, together with the rear side 12 of the valve body 1, forms the control chamber 4.

Figure 3:
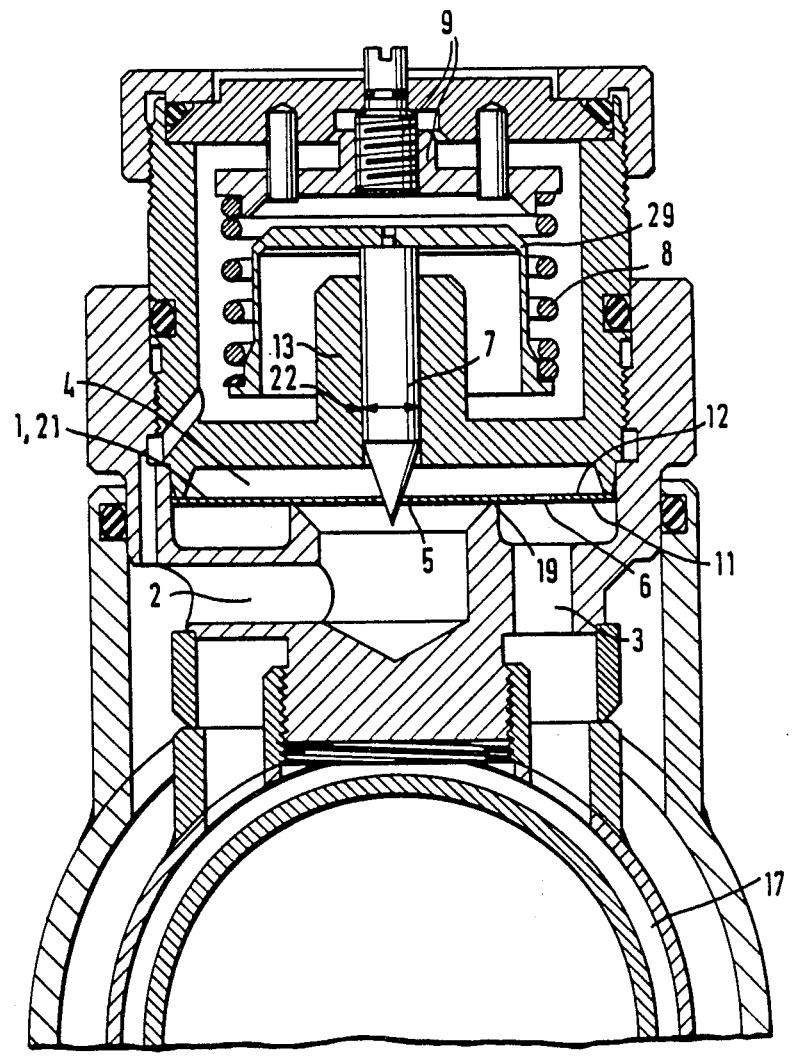
FIG. 3 shows one embodiment, in which the axially movable valve body is designed as a flexible membrane.

FIG. 3 illustrates another configuration of a control. Starting from a bypass 17, the valve body 1 is pressurized on the pressure side via the damping passage 3. The valve body 1 is designed as a membrane 21. The membrane 21, on its outer circumference, is in sealed contact with the housing 13, and has a constant throttle hole 6, which connects the pressure side damping passage 3 with the control chamber 4. The control pin 7 guided in the housing 13 acts on the throttle hole 5, and an axial displacement of the control pin 7 is possible by means of the control surface 22. When there is a corresponding pressure increase in the damping passage 3, the membrane 21 is axially deformed, so that the damping medium can flow past the valve seat 19 in the discharge direction into the damping passage 2. In this embodiment, too, the pressure in the control chamber 4 determines not only the axial movement of the membrane 21, but also the axial movement of the control pin 7. If the control pin 7 lifts off the throttle hole 5 and opens the throttle hole 5, then the damping fluid travels from the control chamber 4 into the damping passage 2, so that when there is a decompression in the control chamber 4, the membrane 21 is moved axially again, and the damping passage 3 is put into direct connection in the discharge direction with the damping passage 2.

Figure 4:
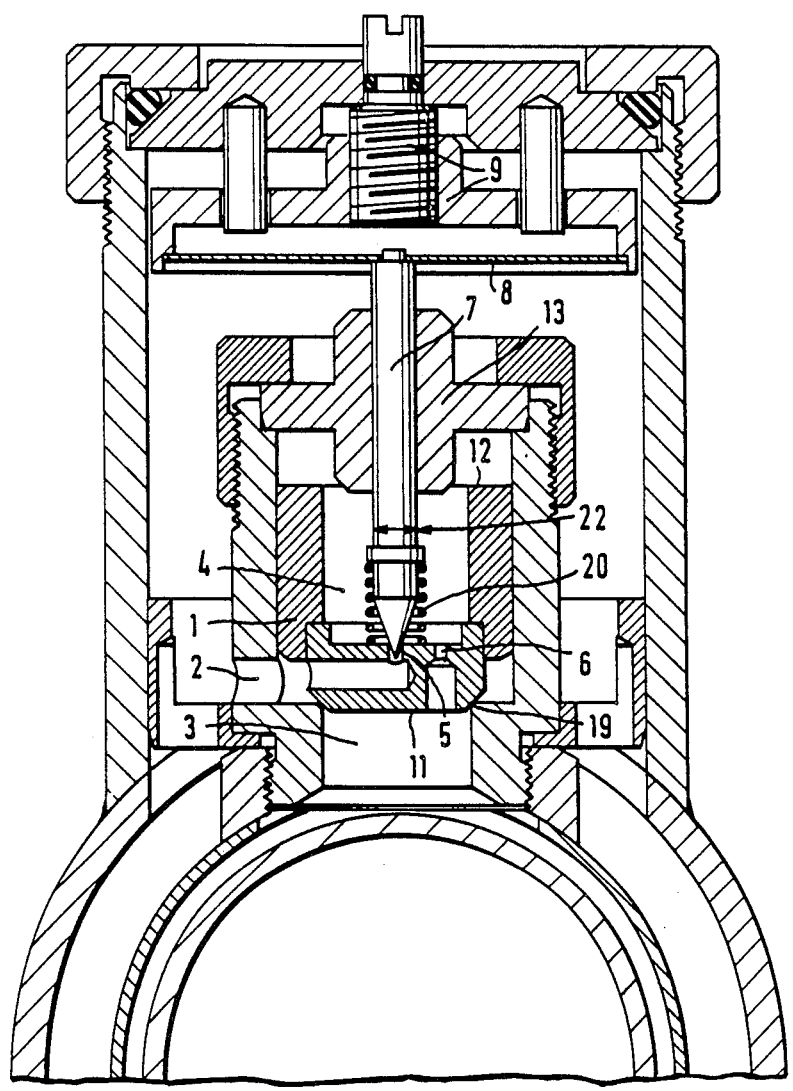
FIG. 4 shows another variant of a control, the principle of which is like that illustrated in FIG. 2, but with the difference that an initial stress is exerted on the control pin by means of a spring washer.

FIG. 4 shows an embodiment in which there is a control, in principle like that illustrated in FIG. 2, with the distinction that the spring 8 is in the form of a disc washer. Otherwise, the operation of this embodiment is the same as that of the embodiment illustrated in FIG. 2.

Figure 5:
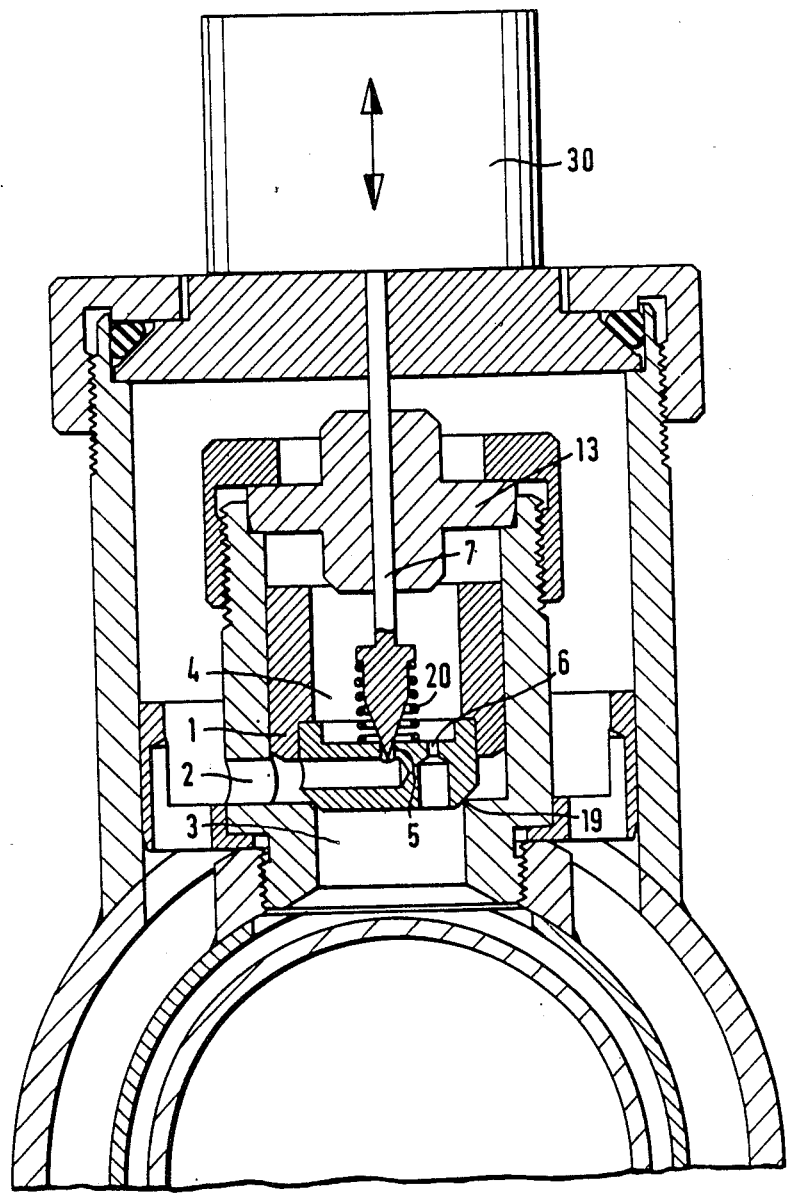
FIG. 5 shows one embodiment of the damping valve, with a directly driven control pin.

FIG. 5 illustrates another embodiment of a regulatable damping valve. In contrast to the configurations shown in FIGS. 2 to 4, the axial guidance of the pin 7 is not provided by a pre-stressed spring, but by an electronically controlled activator 30. In this manner, a variation of the damping characteristic can be implemented as desired, if a microprocessor is used to determine the damping pressure prevailing in the passage 3.

Figure 6:
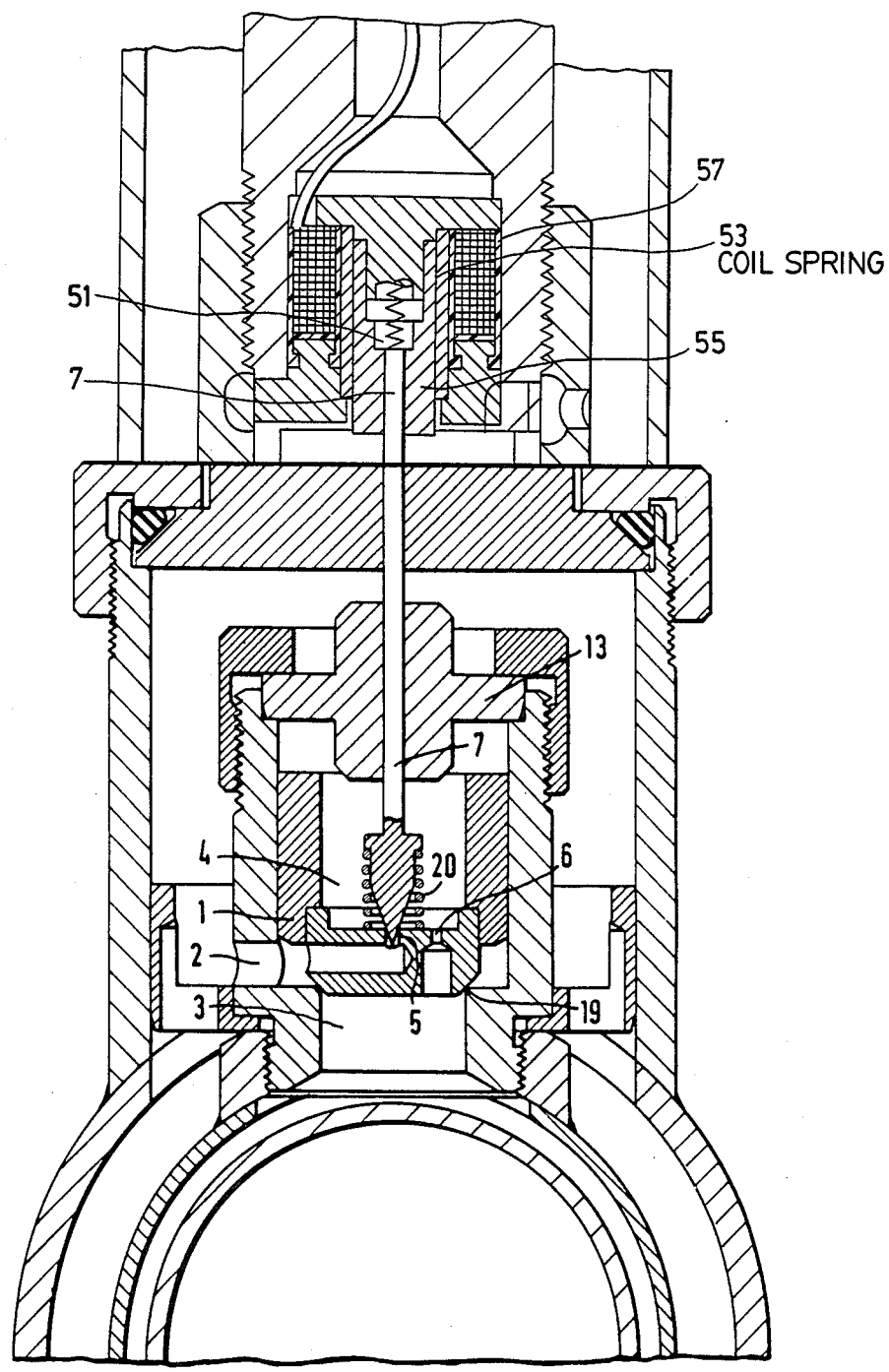
FIG. 6 shows the activator of FIG. 5 in detail.

FIG. 6 shows the activator 30 of FIG. 5 in detail. The activator 30 has an electromagnet 8 with a coil spring 19 disposed in the center thereof. This coil spring 19 presses against a washer 51 which is attached to the top of control pin 7. Another coil spring is disposed to keep the armature 55 from moving within the electromagnet coil assembly 57. The armature is held in a downward position by a coil spring 53 so that when the electromagnet 57 is not energized, the armature is positioned in an extended position, that is, as seen in FIG. 6, a lowered position. The valve body 1 moves up and down which will move the control pin 7 up and down with it. If it were not for the spring 19 and the washer 51, the control pin 7 may not ride up and down as easily with the valve body 1 and the armature may not hold the control pin 7 down against the throttle hole 5. However, when the electromagnet 57 is energized, the armature 55 will move upwardly and pull the control pin 7 by its washer 51 away from the throttle hole 5. This arrangement allows for the valve body 1 and the control pin 7 thereon to move freely within a certain range of motion and not be disturbed by the operation of the activator 30.

In summing up, one aspect of the invention resides in an adjustable vibration damper, in particular for motor vehicles, with a cylinder containing a damping fluid, an axially-movable piston rod projecting into the cylinder in a sealed manner, and a damping piston fastened to the piston rod, which piston divides the cylinder into two work chambers, whereby a damping valve with an axially-movable valve body and a valve seat controls the effective cross section of a damping passage, wherein the valve body 1, starting from its pressurized end surface 11, has at least one constant throttle cross section 6 running toward the rear side 12 located on the opposite end, and another throttle cross section 5 running from the rear side 12 in the discharge direction of the damping passage 2, by means of which the position of an axially movable control pin 7 can be continuously controlled.

Another aspect of the invention resides in a vibration damper, wherein the valve body 1, starting from its pressurized end surface 11, has at least one constant throttle cross section 6 running toward the rear side 12 located on the opposite end, and another throttle cross section 5 running from the rear side 12 in the discharge direction of the damping passage 2, by means of which the position of an axially movable, spring loaded control pin 7 can be controlled, whereby the rear side 12 of the valve body 1 and the housing 13 guiding the control pin 7 are part of the wall of a control chamber 4.

Yet another aspect of the invention resides in a vibration damper, wherein the damping valve 14 is located in a bypass 17 which runs between the work chambers 15, 16.

A further aspect of the invention resides in a vibration damper, wherein the valve body 1 being held against the valve seat 19 by means of a spring 18.

A yet further aspect of the invention resides in a vibration damper, wherein there is a spring 20 between the valve body 1 and the control pin 7.

Yet another further aspect of the invention resides in a vibration damper, wherein the valve body 1 is designed as a flexible membrane 21 which is in sealed contact with the outside circumference.

An additional aspect of the invention resides in a vibration damper, wherein the throttle hole 5 acted upon by the control pin 7 is located in the center of the flexible membrane 21.

A yet additional aspect of the invention resides in a vibration damper, wherein the spring 8 acting on the control pin 7 is a spring washer or a spiral spring.

A further additional aspect of the invention resides in a vibration damper, wherein the control pin 7, on its side facing the rear side 12 of the valve body 1, has a pressurized control surface 22.

A yet further additional aspect of the invention resides in a vibration damper, wherein the spring 8 acting on the control pin 7 is supported on an adjustable actuator 9 which can be activated from the outside.

Another further additional aspect of the invention resides in a vibration damper, wherein the actuator 9 can be regulated manually or electronically.

A yet another additional aspect of the invention resides in a vibration damper, wherein the control pin 7 is acted on by means of an actuator 30.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:
   means for throttling said damping fluid when said damping fluid moves from one of said chambers into another;
   said piston assembly having a piston rod and piston;
   said piston rod having first means for attachment of said piston rod at one end thereof;
   said cylinder assembly having second means for attachment at a portion thereon other than said first means for attachment at said piston rod;
   means for bypassing damping fluid between said at least two chambers;
   means for accepting bypassed damping fluid;
   said bypassing means being disposed to bypass said damping fluid from at least one of said damping fluid-containing chambers to said accepting means;
   said bypassing means including damping valve means for regulating flow of said damping fluid in said bypassing means;
   said damping valve means comprising:
   a principal valve seat and a first displaceable component for opening and closing against said principal valve seat;
   said first displaceable component having a first portion for being disposed against said valve seat and a second portion opposite said first portion;
   a first, constantly open, bypass orifice being disposed at least in said first portion of said first displaceable component for bypassing pressure buildup at said first portion at least to said second portion of said displaceable component;
   a second bypass orifice being disposed in said first displaceable component for bypassing pressure buildup substantially at said second portion to at least a part of said first portion of said first displaceable component; and
   a second displaceable component for varying flow through said second bypass orifice, said second displaceable component and said first displaceable component being independently displaceable relative to each other.

2. The vibration damper for motor vehicles, according to claim 1, wherein said first portion comprises a pressurized surface of said first displaceable component for holding against pressure developed by said piston.

3. The vibration damper for motor vehicles, according to claim 2, including means for positioning said second displaceable component with respect to said second orifice; and said means for positioning said second displaceable component comprising spring means for spring loading said second displaceable component.

4. The vibration damper for motor vehicles, according to claim 3, wherein a control chamber disposed at said second side of said first displaceable component, said second side of said first displaceable component comprising a wall of said control chamber; and
another portion of said chamber comprising a housing for guiding and aligning said second displaceable component with said second orifice.

5. The vibration damper for motor vehicles, according to claim 3, wherein said spring means comprises means for holding said second displaceable component against said second bypass orifice.

6. The vibration damper for motor vehicles, according to claim 3, wherein said spring means comprises additional spring means for urging said second displaceable component away from said second orifice.

7. The vibration damper for motor vehicles, according to claim 1, wherein said first displaceable component comprises a flexible membrane with an outer peripheral portion and central portion, said flexible membrane being fastened at said outer peripheral portion to said valve means.

8. The vibration damper for motor vehicles, according to claim 7, wherein said second orifice is disposed in a central portion of said membrane.

9. The vibration damper for motor vehicles, according to claim 5, wherein said means for holding said second displaceable component against said second bypass orifice comprises a member of the group consisting essentially of a spring washer and a spiral spring.

10. The vibration damper for motor vehicles, according to claim 1, wherein said second displaceable component has a portion for making contact with said second orifice and a portion for being exposed to pressure passed through said first orifice, said portion exposed to pressure passed through said first orifice having a control surface.

11. The vibration damper for motor vehicles, according to claim 3, wherein said spring means comprises adjustable means for varying the spring loading of said spring means on said second displaceable component, said adjustable means having means for adjustment being external to said valve means.

12. The vibration damper for motor vehicles, according to claim 11, wherein said means for adjustment external to said valve means are manual means for adjustment.

13. The vibration damper for motor vehicles, according to claim 11, wherein said means for adjustment external to said valve means are electrical means for adjustment.

14. The vibration damper for motor vehicles, according to claim 1, wherein said second displaceable component comprises an elongated body having a substantially pointed end for fitting into and thus controlling flow through said second orifice.

15. The vibration damper for motor vehicles, according to claim 3, wherein said second displaceable component comprises an elongated body having a substantially pointed end for fitting into and thus controlling flow through said second orifice.

16. The vibration damper for motor vehicles, according to claim 4, wherein said second displaceable component comprises an elongated body having a substantially pointed end for fitting into and thus controlling flow through said second orifice.

17. The vibration damper for motor vehicles, according to claim 8, wherein said second displaceable component comprises an elongated body having a substantially pointed end for fitting into and thus controlling flow through said second orifice.

18. The vibration damper for motor vehicles, according to claim 11, wherein said second displaceable component comprises an elongated body having a substantially pointed end for fitting into and thus controlling flow through said second orifice.

19. The vibration damper for motor vehicles, according to claim 1, including an actuator for controlling movement of said second displaceable body.

* * * * *